(12) United States Patent
Reeb et al.

(10) Patent No.: US 6,499,324 B2
(45) Date of Patent: Dec. 31, 2002

(54) AUTOMOBILE ANTI-THEFT SYSTEM

(76) Inventors: Rex Reeb, 1402 W. Sandpiper, Gilbert, AZ (US) 85233; Colin G. O'Hair, 2623 W. Ironstone Ave., Apache Junction, AZ (US) 85220

( * ) Notice: Subject to any disclaimer, the term of this patent is extended or adjusted under 35 U.S.C. 154(b) by 25 days.

(21) Appl. No.: 09/773,084

(22) Filed: Jan. 31, 2001

(65) Prior Publication Data

US 2002/0100300 A1 Aug. 1, 2002

(51) Int. Cl.$^7$ ............................................. F16H 57/00
(52) U.S. Cl. ............................ 70/201; 70/181; 70/256; 70/237
(58) Field of Search ......................... 70/201, 202, 237, 70/181, 192, 256; 180/287

(56) References Cited

U.S. PATENT DOCUMENTS

| | | | | |
|---|---|---|---|---|
| 1,676,623 A | * | 7/1928 | Turner | 70/256 |
| 1,764,383 A | * | 6/1930 | Bezek | 70/202 X |
| 1,770,801 A | * | 7/1930 | Perrelly | 70/202 |
| 2,765,648 A | * | 10/1956 | Hatcher | 70/264 |
| 2,931,207 A | * | 4/1960 | Fisher | 70/181 |
| 2,933,916 A | | 4/1960 | Dean | 70/192 |
| 3,470,974 A | * | 10/1969 | Pefine | 180/114 |
| 3,631,694 A | * | 1/1972 | Teroux | 70/202 |
| 4,076,095 A | | 2/1978 | Adamski | 70/202 X |
| 4,333,326 A | | 6/1982 | Winters | 70/203 |
| 4,566,556 A | * | 1/1986 | Wodeslavsky | 70/237 X |
| 4,732,018 A | | 3/1988 | Crosby | 70/19 |
| D312,200 S | | 11/1990 | Bhagwat | D8/333 |
| 5,040,387 A | * | 8/1991 | Knott, Jr. | 70/202 |
| 5,263,345 A | * | 11/1993 | Zagorac | 70/201 |
| 5,359,868 A | | 11/1994 | Villani | 70/203 |
| 5,363,270 A | * | 11/1994 | Wahba | 361/155 |
| 5,379,619 A | | 1/1995 | Young | 70/202 |
| 5,482,136 A | | 1/1996 | Sorkin | 180/287 |
| 5,586,457 A | | 12/1996 | Keener | 70/201 |
| 5,842,364 A | * | 12/1998 | Oliver | 70/202 |
| 5,950,463 A | | 9/1999 | Glazier | 70/202 |
| 6,029,483 A | * | 2/2000 | Daniels | 70/199 |

* cited by examiner

*Primary Examiner*—Suzanne Dino Barrett
(74) *Attorney, Agent, or Firm*—Schmeisser, Olsen & Watts LLP (57) ABSTRACT

A remote-controllable automobile anti-theft device replaces a common connection between the accelerator and the throttle of an automobile with a locking main shaft connector between an accelerator shaft and a throttle shaft. The locking main shaft rotates about a central axis in response to motion from the accelerator, and translates that motion to the throttle. The locking main shaft contains a hole. The remote control activates a push-pull solenoid which reversibly inserts a solenoid locking pin into the hole in the locking main shaft. When the solenoid locking pin is inserted into the hole in the locking main shaft, the locking main shaft is prevented from rotating around a pivot axis of the locking main shaft. Therefore, when the locking pin is inserted into the hole in the locking main shaft, motion of an accelerator shaft does not translate to the throttle shaft, and the automobile's engine cannot rev.

31 Claims, 5 Drawing Sheets

AUTOMOBILE ANTI-THEFT SYSTEM

BACKGROUND OF THE INVENTION

1. Technical Field

This invention generally relates to an anti-theft system for uncoupling an automobile's throttle from its accelerator using a remote switching device, while maintaining a normal feel to the accelerator pedal.

2. Background of the Invention

In the late 1990's an automobile was stolen every 25 seconds in the United States, contributing to a $7.5 billion auto theft business and growing, according to the Insurance Information Institute. Anti-theft devices include car alarms, large locks such as "The Club (R)," GPS tracking devices which keep track of the location of a car, and immobilizer, devices which prevent a car from starting for an unauthorized driver. While these devices are somewhat effective deterrents to car thieves, car theft continues to be a significant problem.

These existing devices have many shortcomings. The sound of car alarms, especially in urban areas, rarely captures the attention of passers-by any more. Padlocks or other small locks on accelerator, brake or clutch pedals can be easily overcome by pushing hard against the pedals and snapping the locks. Large locks can be easily defeated by thieves who carry equally large cutters. Large automobile locks applied to the steering wheel, brake, clutch, or accelerator can be unwieldy to apply, remove and store.

GPS tracking devices can provide round-the-clock monitoring of a vehicle's location. However, this type of monitoring can mean a high monthly bill. And, thieves know that these devices can be disconnected. In addition, some owners are wary of allowing an unknown entity to know the whereabouts of their vehicle round-the-clock. Many of these devices must be disabled or removed by the driver before the car starts moving, leaving the driver defenseless against a carjacker who enters the automobile while it is in operation.

Therefore there exists a need to provide an effective automobile anti-theft device which is not easily overcome by a thief with big cutters, is effective against carjackers, can be operated with a remote control device, and retains the feel of a normal operable accelerator pedal, even while the device is engaged.

DISCLOSURE OF INVENTION

According to a preferred embodiment of the present invention, this invention provides a locking device which reversibly disengages the accelerator from the throttle of an automobile. A locking pin is selectively extendable into an aperture in the locking device such that when the locking pin is extended into the aperture, the accelerator is prevented from actuating the throttle to cause the engine to rev, and when the locking shaft is not extended into the aperture the accelerator performs normally.

Preferred embodiments of the present invention may include the following features alone or in combination. The system is easily installed at the factory or after-market because it replaces the factory bushing and accelerator-throttle linkage commonly found affixed to the floor of the passenger compartment behind the accelerator pedal of many automobiles. The invention is difficult to remove because the working parts are contained in a tamper-resistant box which is affixed to the floor of the passenger compartment by fasteners which are inserted from the engine side of the firewall. To remove the invention from a parked car, a thief would have to spend time underneath the automobile. Because the invention constitutes the linkage between the accelerator and the throttle, even if a thief managed to remove the protective tamper-resistant box, cutting through the working parts of the invention would disconnect the accelerator from the throttle, rendering the automobile immobile. In addition, the locking device can be engaged and disengaged using a dashboard switch, a remote switching device or integrated paging systems. The invention can be activated even while the automobile is in motion and the accelerator is pressed. When activated while the automobile is in motion, the locking device will not operate to disengage the accelerator from the throttle until the driver takes her foot off of the accelerator, to engage the brake, for example. Then, the lock can snap into place so that the driver cannot accelerate again. And, the accelerator pedal retains some "give" even when the device is engaged and locked.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements.

MODES FOR CARRYING OUT THE INVENTION

According to a preferred embodiment of the present invention, this invention provides a locking device which reversibly disengages the accelerator from the throttle of an automobile. A locking shaft is selectively extendable into an aperture in the locking device such that when the locking shaft is extended into the aperture, the accelerator is prevented from actuating the throttle to cause the engine to rev, and when the locking shaft is not extended into the aperture the accelerator performs normally. The locking shaft is preferably extended the aperture using a remote control device.

Figure 1:
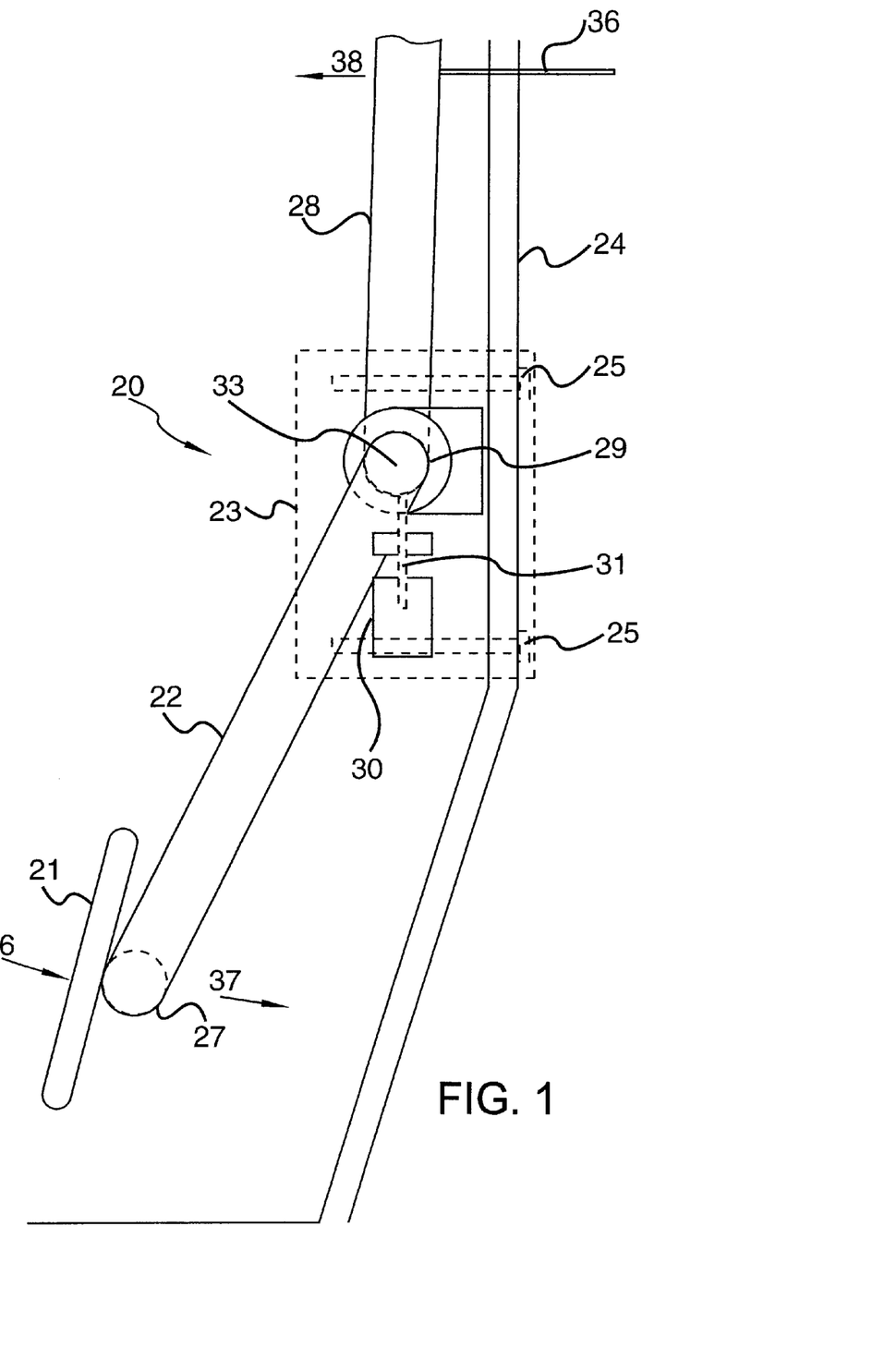
FIG. 1 is a side view of the anti-theft device according to a preferred embodiment of the present invention.

FIG. 1 is a side view of the anti-theft device 20 which provides a locking device to reversibly disengage the accelerator from the throttle of an automobile. A preferred embodiment of this invention replaces the factory bushing commonly found affixed to the floor of the passenger compartment. This factory bushing commonly provides a pivot point for Z-shaped metal bar which transfers motion of the accelerator pedal, through a well-known attachment point, to the throttle inside the engine. In a preferred embodiment of this invention, the Z-shaped metal bar is replaced by an accelerator shaft 22 coupled at one end to the accelerator pedal 21 and at the other end to a main shaft 45. The central axis 33 of main shaft 45 forms the pivot axis of the accelerator-throttle coupling. The main shaft 45 is coupled at one end to the accelerator shaft 22 and at the other end to a throttle shaft 28. Together, accelerator shaft 22, main shaft 45 and throttle shaft 28 form a replacement Z-shaped complex which transfers motion from accelerator pedal 21 to the throttle to cause the car's engine to rev. The complex passes through a steel tamper-resistant box 23 through bushings 40. The whole complex is attached to the internal surface of the fire wall by security fasteners such as headless screws, tap-through screws, rivets or other similar fastening devices. Because the present invention replaces the factory bushing, it provides the connection between the accelerator pedal and the throttle. Cutting through the present invention would serve to sever the connection between the accelerator pedal and the throttle, rendering the automobile immobile.

FIG. 1 illustrates an accelerator pedal 21 attached to an accelerator shaft 22 at pedal end 27 of accelerator shaft 22. In a preferred embodiment, accelerator pedal 21 is a well-known accelerator pedal 21 with a rubberized non-skid coating on its foot-surface 26. Preferably, accelerator shaft 22 is made of spring steel through its entire length which allows the accelerator shaft 22 to bend in response to pressure exerted against the foot surface 26 of the accelerator pedal 21, even if the housing end 29 of accelerator shaft 22 is locked in place. Accelerator shaft preferably 22 passes through housing 23 through an opening or bushing notch 48 (see FIG. 2). Contained in bushing notch 48 is bushing 40. Bushing 40 is preferably a well-known brass bushing. Alternatively and equally preferably, bushing 40 is a roller bearing. Housing 23 is preferably a hard metal housing which is preferable to prevent tampering with the housing and to make the housing difficult to disturb with large cutters. Housing 23 is preferably constructed of steel, hardened steel and/or solid aluminum. Housing 23 is preferably affixed to fire wall 24 by long mounting screws 25 mounted from the engine side of the fire wall. Also illustrated in FIG. 1 is the solenoid 30 with its solenoid pin 31.

As illustrated in FIG. 1, as accelerator pedal 21 is compressed by a foot (not shown) applying pressure to accelerator pedal 21 on its foot-surface 26, accelerator shaft 22 preferably pivots toward fire wall 24 around pivot point 33, as illustrated by arrow 37, causing throttle shaft 28, which is coupled to accelerator shaft 22 by main shaft 45, to pivot away from fire wall 24 around pivot point 33, as illustrated by arrow 38, causing throttle cable 36 to be pulled in the direction illustrated by arrow 38, causing the engine to rev. While this is one well-known connection between the accelerator and the throttle, the device can be modified to accommodate different throttle designs and different shapes and types of accelerator-throttle linkages.

Figure 2:
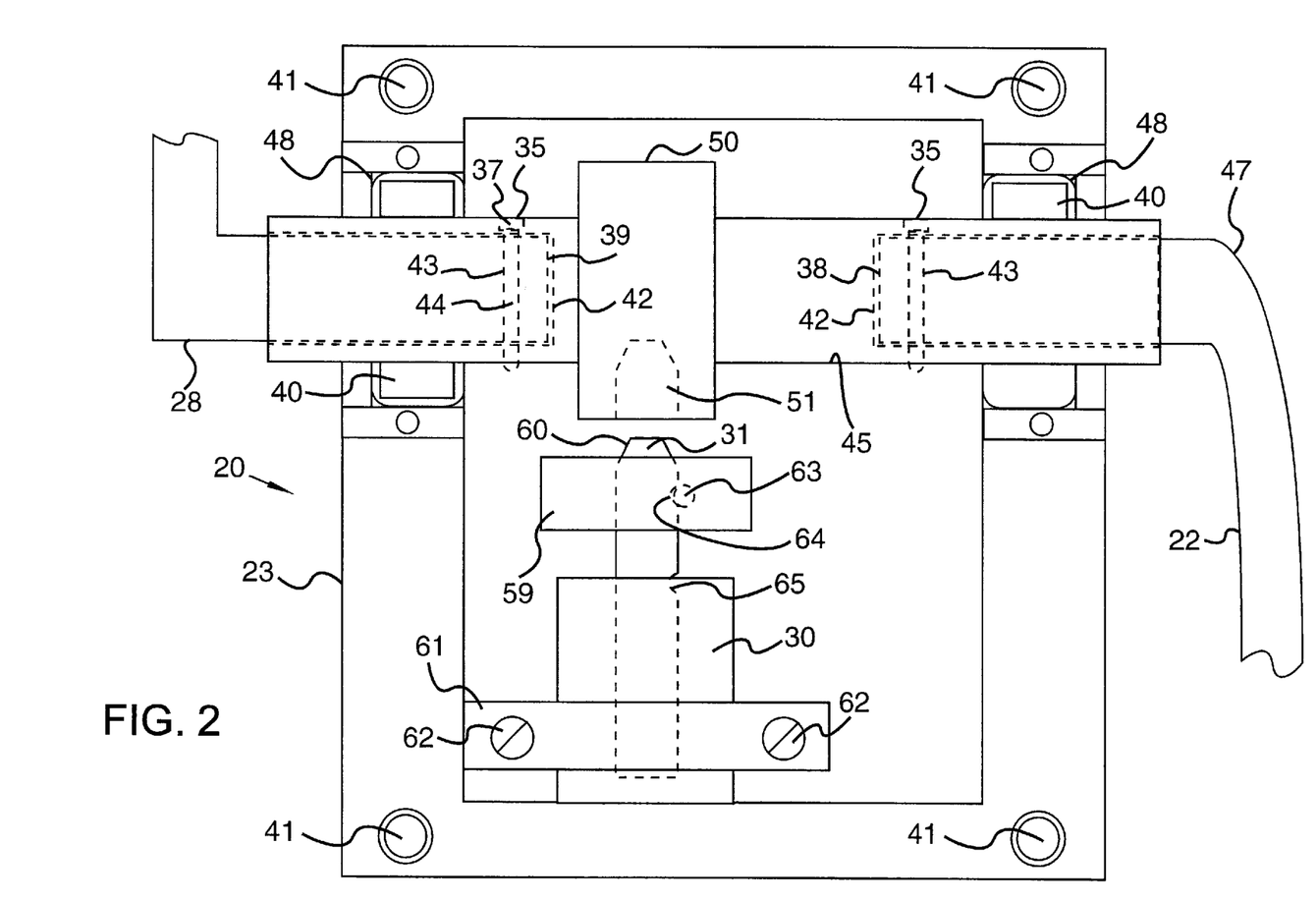
FIG. 2 is a front view of a preferred embodiment of the present invention with its lid removed.

FIG. 2 illustrates a preferred embodiment of anti-theft device 20, affixed to fire wall 24 (see FIG. 1), with lid (not shown) of housing 23 removed so that the contents of housing 23 are visible. FIG. 2 illustrates four through holes 41, through which mounting screws 25 (see FIG. 1) pass. Main shaft end 38 of accelerator shaft 22 preferably inserts into first bore hole 42 of main shaft 45. Main shaft 45 passes through first bushing 40. Accelerator shaft 22 is preferably locked in main shaft 45 by locking pin 35. Main shaft end 39 of throttle shaft 28 preferably inserts into second bore hole 42 of main shaft 45. Main shaft preferably passes through second bushing 40. Second locking pin 35 preferably attaches main shaft end 39 of throttle shaft inside second bore hole 42 in the throttle end of main shaft 45. Throttle shaft 28 preferably bends at approximately a 90° angle to turn up toward its connection with a throttle cable (not shown).

FIG. 2 illustrates that accelerator shaft 22 is preferably attached to main shaft 45 which is attached to throttle shaft 28. When pressure is applied to accelerator pedal 21 (see FIG. 1), accelerator shaft 22 moves (see arrow 37, FIG. 1), preferably causing a rotational movement of main shaft 45 around pivot point 33 (see FIGS. 1 and 4) which is the central axis of main shaft 45. Throttle shaft 28, attached to main shaft 45, also preferably rotates around pivot point 33 (see FIGS. 1 and 4) which is the central axis of main shaft 45. Main shaft 45 is preferably a ¾ inch solid steel cylinder with bore holes 42 at each end to receive accelerator shaft 22 and throttle shaft 23. Main shaft 45 also has two preferable locking pin holes 43 into which locking pins 35 are inserted and solenoid pin hole 51 into which solenoid pin 31 inserts.

FIG. 2 illustrates locking pins 35 which are preferably safety break-away pins. Locking pins 35 are preferably made of aluminum. In the event that a large force is applied to accelerator pedal 21 (see FIG. 1) and accelerator shaft 22 (a stomping force), locking pins 35 could preferably be the first to break, by shearing the head 37 of locking pin 35 away from the body 44 of locking pin 35, allowing accelerator shaft 22 to rotate inside main shaft 45 without transferring the rotational motion to main shaft 45 and to throttle shaft 28. Thus, if an unauthorized driver were to stomp on the accelerator, with the locking device engaged, instead of disabling the lock and enabling the automobile to accelerate, the unauthorized driver would simply irreversibly disable the automobile's ability to accelerate. These sheared locking pins 35 could be easily replaced by a person with knowledge of the device by removing the lid of housing 23 and replacing the sheared pins.

FIG. 1 also illustrates that a preferred embodiment of the present invention is simple to install and replace. In the aftermarket, a "kit" containing the replacement for the factory bushing (which is affixed to the passenger side of the firewall of the automobile just like the factory bushing), could contain housing 23 containing push-pull solenoid 30, a replacement steel shaft for throttle shaft 28 which could attach to throttle cable 36 according to factory specifications at one end, and could contain a hole for locking pin 35 at the other end. The kit could also contain a replacement spring steel shaft for accelerator shaft 22 with an accelerator pedal 21 at one end and a hole for locking pin 35 at the other end. The factory bushing and Z-shaped rod could be removed from their attachments and discarded. Housing 23 could be affixed to firewall, and lid (not shown) of housing 23 could be left open. Throttle shaft 28 could be inserted into main shaft 45 and locked in place with locking pin 35. Accelerator shaft 22 could be inserted into main shaft 45 and locked in place with locking pin 35. Throttle shaft 28 could be attached to throttle cable (not shown) according to factory specifications. Placement of solenoid pin 31 into hole 51 in locking disk 50 could be adjusted by adjusting guide plate with shaft lock 59 before lid (not shown) of housing 23 is attached to housing 23 with mounting screws 25. If the anti-theft device is installed in the factory as the automobile is being assembled, throttle shaft 28, housing 23 and accelerator shaft 22 (attached to accelerator pedal 21) could be attached to throttle cable 36 (not shown) and firewall 24 in place of the common factory bushing. Preferably, no major retooling would be required at the factory to install the locking device.

In a preferred embodiment of the present invention, lid (not shown) of housing 23 is attached to housing 23 by mounting screws 25 which are inserted from the engine side of fire wall 24. Therefore, in a preferred embodiment of the present invention, to remove the preferred embodiment of the present invention requires that the person removing housing 23 be underneath the automobile for extended periods of time. While this is simple to accomplish while the automobile is on risers in a factory or in a mechanic shop, it is unattractive to an unauthorized driver. This is an additional theft-deterrent.

FIG. 2 also illustrates that fixedly attached to main shaft 45 is locking disk 50, in a preferred embodiment of the present invention. Locking disk 50 is preferably a hardened steel disk, attached to main shaft 45 by welding or other attachment means, or cast as a single unit with main shaft 45. Locking disk 50 preferably has a hole 51 or aperture for receiving pin 31 or locking shaft of push-pull solenoid 30. Pin 31 preferably has a tapered end 60 to assist with moving slidingly into hole 51. Pin 31 can be rounded, blade shaped, cylindrical or other shapes. Hole 51 can be shaped to receive pin 31. Push-pull solenoid 30 is affixed to housing 23 by push-pull solenoid hold down clamp 61 which is attached to housing 23 by screws 62. Pin 31 is guided into hole 51 of locking disk 50 by guide plate with shaft lock 59. Guide plate with shaft lock has a detent ball 63. Detent ball 63 is preferably made of hardened ball bearing steel. Pin 31 preferably has two detents, an unlocked detent 64 and a locked detent 65. When pin 31 is in the unlocked position (as shown in FIG. 2), unlocked detent 64 is engaged against detent ball 63. When pin 31 is in the locked position, pin 31 is extended upwards into hole 51 of locking disk 50, and locked detent 65 is engaged against detent ball 63. When pin 31 is in the locked position, with pin engaged inside hole 51 of locking disk 50, main shaft 45 is locked in place and cannot rotate around its central axis (or pivot point 33). Pin 31 or locking shaft, is selectively extendable into hole 51 or aperture opening, such that when pin 31 or locking shaft is not extended into hole 51 or aperture opening the accelerator can operate the throttle and when pin 31 or locking shaft is extended into hole 51 or aperture opening the accelerator is prevented from operating the throttle.

In an alternate and equally preferred embodiment, main shaft 45 has a larger diameter along its entire length, and hole 51 is in main shaft, without locking disk 50. In this alternate and equally preferred embodiment, pin 31 engages slidingly into hole 51 in main shaft 45. In addition, in this embodiment, guide plate with shaft lock 59 is not necessary, simplifying the manufacture of the anti-theft device and decreasing manufacturing costs.

FIG. 2 illustrates that when pin 31 is engaged inside hole 51 and pressure is applied against accelerator pedal 21 (see FIG. 1), because main shaft 45 cannot rotate (because it is locked in place) accelerator shaft 22 cannot rotate around pivot point 33, no rotational motion can be translated to throttle shaft 28, and the automobile engine will not rev. However, because accelerator shaft 22 is preferably made of spring steel, accelerator shaft 22 can flex. This preferable flexion can occur at the bend 47 of accelerator shaft 22. Therefore, although accelerator shaft 22 cannot rotate around pivot point 33, translating its rotational motion to throttle shaft 28, it can preferably move by allowing flexion in accelerator shaft 28 itself. Therefore, although no torque is being transmitted to throttle shaft 28 and throttle (not shown), a person pressing down on accelerator pedal 21 (see FIG. 1), would feel some movement in the accelerator pedal 21 (see FIG. 1) but the engine would not rev. Because of this, a would-be thief might not be tempted to simply press with force (stomp) on the accelerator pedal 21 which might break the locking mechanism, which would also cause the accelerator to be unable to operate the throttle. In addition, because the preferable spring steel of the accelerator shaft 22 absorbs some of the energy of pressure on the accelerator pedal, locking pins 35 will not shear unless extraordinary force is applied to accelerator pedal 21. The continued performance the accelerator pedal of a preferred embodiment of the present invention might cause a would-be-thief to think that the automobile is in need of repair, and therefore not a good candidate for theft. Therefore, in a preferred embodiment of the present invention, spring steel or other flexion prevents lock damage and confuses the unauthorized driver.

In an alternate preferred embodiment, accelerator shaft 22 can be made of metal and have a spring-like element at its bend 47 (see FIG. 2) before it inserts into main shaft 45. In this preferred alternate embodiment, when a foot presses on the foot-surface of the accelerator pedal 21, if the main shaft 45 lock is engaged, the accelerator shaft 22 twists around the spring-like element and "gives", lending a nearly normal "feel" to the accelerator pedal 21, without successfully engaging throttle shaft 28 and without successfully revving the engine. Alternatively and also preferably, this flexion can occur by the use of a slip clutch, hydraulic or viscous coupling or geared coupling.

Figure 3:
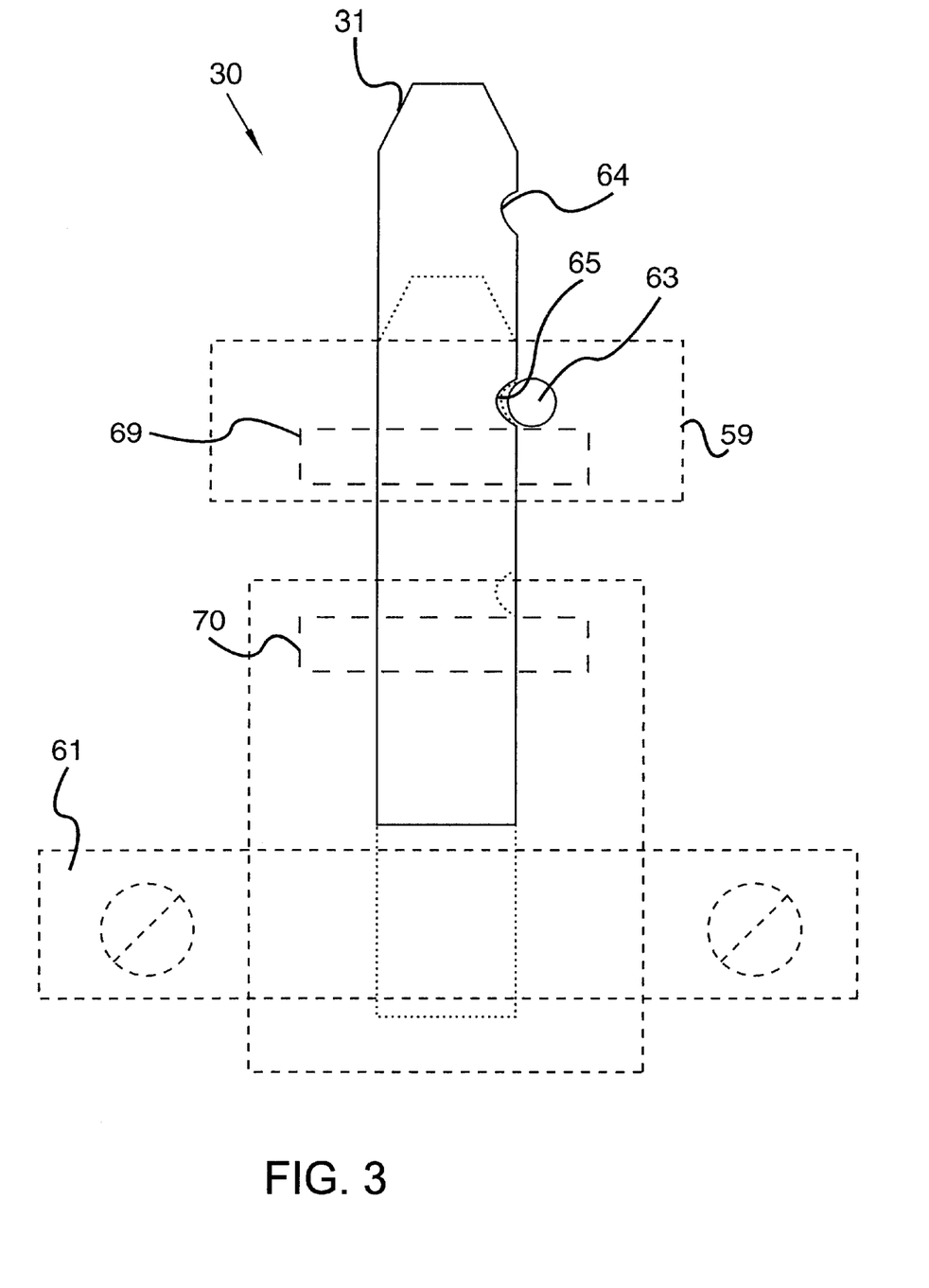
FIG. 3 is a front view of a preferred embodiment of a solenoid of the present invention.

FIG. 3 illustrates a preferred embodiment of push-pull solenoid 30. FIG. 3 illustrates pin 31 with unlocked detent 64 and locked detent 65, guide plate with shaft lock 59, push-pull solenoid hold down clamp 61 and detent ball 63. Preferably, pin 31 is made of ferrous steel or other magnetic metallic material. Preferably, push-pull solenoid 30 has a locking coil 69 and an unlocking coil 70. Preferably, when an "on" button is pushed on the well-known remote control device (not shown) sending an "on" signal, locking coil 69 is energized, creating a magnetic field which causes pin 31 to center itself in relation to locking coil 69. When pin 31 is centered in relation to locking coil 69, locked detent 65 sets against detent ball 63 to hold pin 31 in place in the locked position, even when pin 31 is not aligned with hole 51 of locking disk 50. Thus, once pin 31 is in place in the locked position (as illustrated in the solid lines in FIG. 3), locking coil 69 does not need to be continuously energized because pin 31 is held in the locked position by detent ball 63.

When an "off" button is pushed on the well-known remote control device (not shown) sending an "off" signal, the unlocking coil 70 is energized, creating a magnetic field which causes pin 31 to center itself in relation to unlocking coil 70. When pin 31 is centered in relation to unlocking coil 70, unlocked detent 64 centers against detent ball 63 to hold pin 31 in place. Thus, once pin 31 is in place in the unlocked position, (as illustrated in the dashed lines in FIG. 3), unlocking coil 70 does not need to be continuously energized in order to maintain pin 31 in the unlocked position. This feature of remaining locked or unlocked without continuously requiring power makes a preferred embodiment of the present invention less susceptible to theft. An unauthorized driver cannot simply cut a power source to the locking device to disable the locking system. In addition, because continuously energizing a coil of a solenoid risks excessive heat build-up and bum-out of the solenoid coils, this feature also reduces the risk of solenoid burn-out.

Alternatively, solenoid pin 31 can be suspended above main shaft 45 and held in place by a magnet. To lock main shaft 45, a push solenoid can be employed to push magnetic solenoid pin 31 away from the magnet, dropping solenoid pin 31 into solenoid pin aperture 52. Then a magnetic pulse from a solenoid could be employed to retrieve solenoid pin 31 from solenoid pin aperture 52. In this way, gravity could be employed to drop solenoid pin 31 in place even if solenoid pin aperture 52 is not aligned with pin 31. Then, when main shaft 45 rotates and solenoid pin 31 becomes aligned with solenoid pin aperture 52, solenoid pin 31 can simply drop into place. Therefore, this preferred embodiment is a gravity-loaded solenoid.

Figure 4:
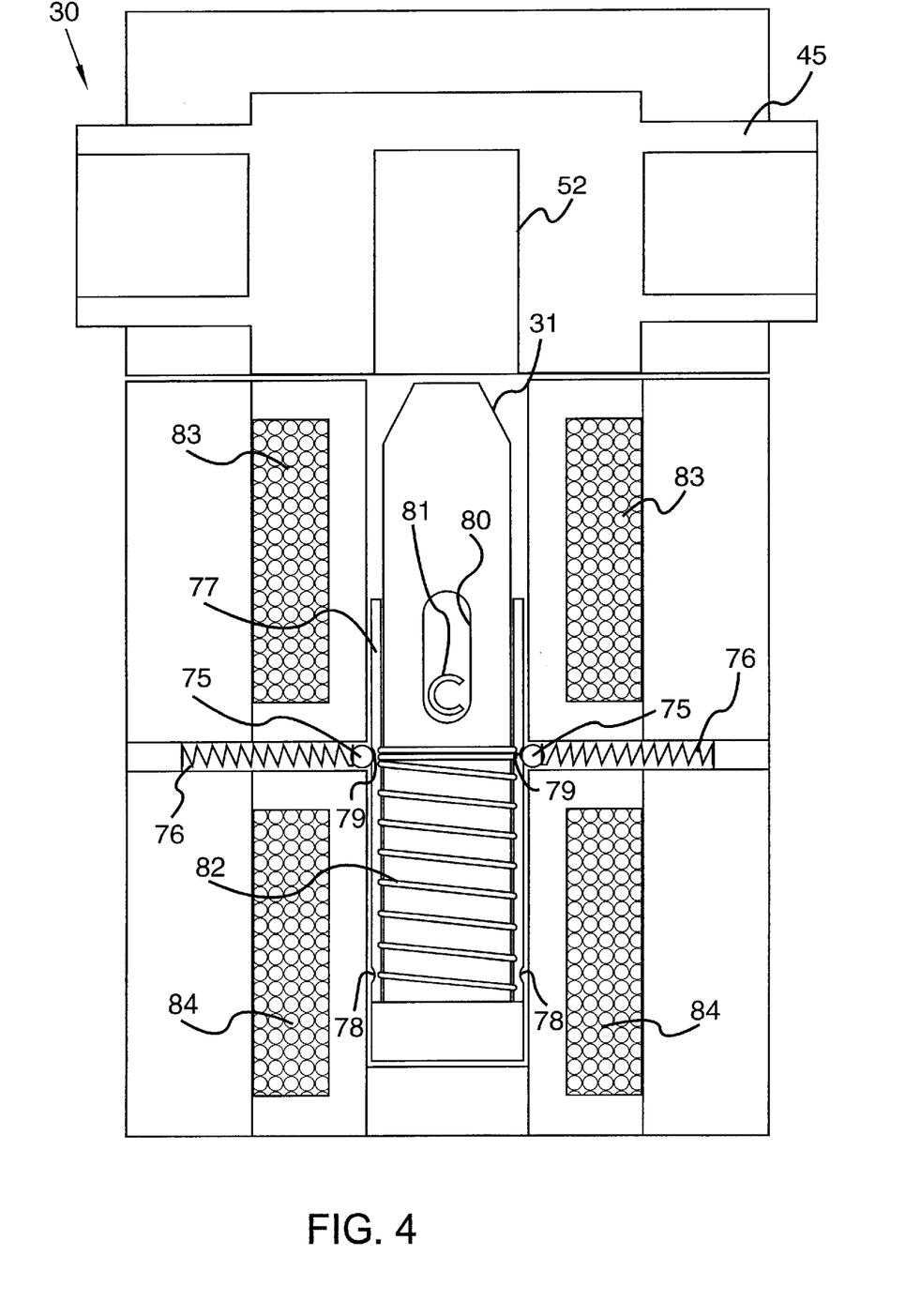
FIG. 4 is a front view of an alternate preferred embodiment of a solenoid of the present invention.

FIG. 4 illustrates an alternate preferred embodiment of the solenoid 30. In this alternate preferred embodiment, solenoid 30 has two detent balls 75 with detent springs 76 and a solenoid pin 31. Solenoid pin 31 is preferably made of stainless steel. Solenoid pin 31 has a sliding pin slot 80. Solenoid pin 31 is preferably encased in magnetic case 77 which has locked detents 78 and unlocked detents 79. Magnetic case 77 also has an integral roll pin 81 which fits slidingly inside sliding pin slot 80. Also inside magnetic case 77 is spring 82, embodying herein a spring-loaded solenoid.

As illustrated in FIG. 4, to engage the locking mechanism in this preferred embodiment, a signal from a remote source such as a remote control energizes the locking-coil 83 which causes magnetic case 77 to center itself in relation to locking coil 83. When magnetic case 77 is centered in relation to locking coil 83, locked detents 78 are opposite detent balls 75, which hold magnetic case 77 in place in the locked position. If solenoid pin aperture 52 is aligned with solenoid pin 31, then solenoid pin 31 extends into solenoid pin aperture 52, locking main shaft 45. If solenoid pin aperture 52 is not aligned with solenoid pin 31, magnetic case 77 moves, spring 82 which is contained inside magnetic case 77 compresses and roll pin 81 slides inside sliding pin slot 80, but solenoid pin 31 cannot advance into solenoid pin aperture 52. Solenoid pin 31 is loaded or spring-loaded.

As soon as main shaft 45 rotates into alignment with solenoid pin 31 (when a driver takes her foot off of the accelerator), solenoid pin 31 is forced to advance into solenoid pin aperture 52, by spring 82. Therefore, in this preferred embodiment, the solenoid is a spring-loaded solenoid. In this way, the anti-theft device 20 can be engaged even while the car is accelerating (while the accelerator pedal 21 is pressed and main shaft 45 is rotated away from its position at rest) without continuously energizing locking coil 83. To disengage solenoid pin 31, unlocking coil 84 is energized, causing magnetic case 77 to center itself in relation to unlocking coil 84 and aligning its unlocked detents 79 with detent balls 75. Solenoid pin 31 then drops back into the unlocked position illustrated in FIG. 4.

If an automobile and driver have been carjacked after the driver has disengaged the locking device, the device can preferably be re-activated with a remote control switch, a pager device or a dashboard switch while the automobile is being driven. This switch could preferably be activated by a passenger inside the automobile, by a police officer in pursuit of the automobile, or by a well-known monitoring system such as "On-Star." For example, the automobile's license plate number could be on file with local law enforcement along with a code for engaging the locking mechanism. Or a DTMF code (Dual Tone Multi Frequency) could be sent from a cellular telephone to initiate a "lock" signal. A carjacked driver could discretely send a signal to local law enforcement using an integrated pager system. Local law enforcement could then send a "lock" signal to the automobile using a remote control device or an integrated pager system. Once the system is turned on and the locking device is in the "lock" position, as soon as the unauthorized driver removes their foot from the accelerator pedal 21, main shaft rotates so that hole 51 of locking disk 50 is aligned with solenoid pin 31, solenoid pin 31 springs into hole 51 of locking disk 50, and the accelerator is disengaged from the throttle, rendering the automobile unable to accelerate again. The automobile would still be able to make use of power steering and power brakes, because the engine would still be running. However, the driver would be unable to lead a high speed chase. The driver would have no choice but to pull off of a roadway. And, the driver would have no indication that a locking device had been activated.

Similarly, a remote monitoring service such as On-Star (R) could preferably engage the locking mechanism in response to a panic signal from an authorized driver. And, for safety reasons, the system could be designed so that the locking system is only engaged if the automobile is traveling less than a prescribed speed (such as 15 miles per hour).

Figure 5:
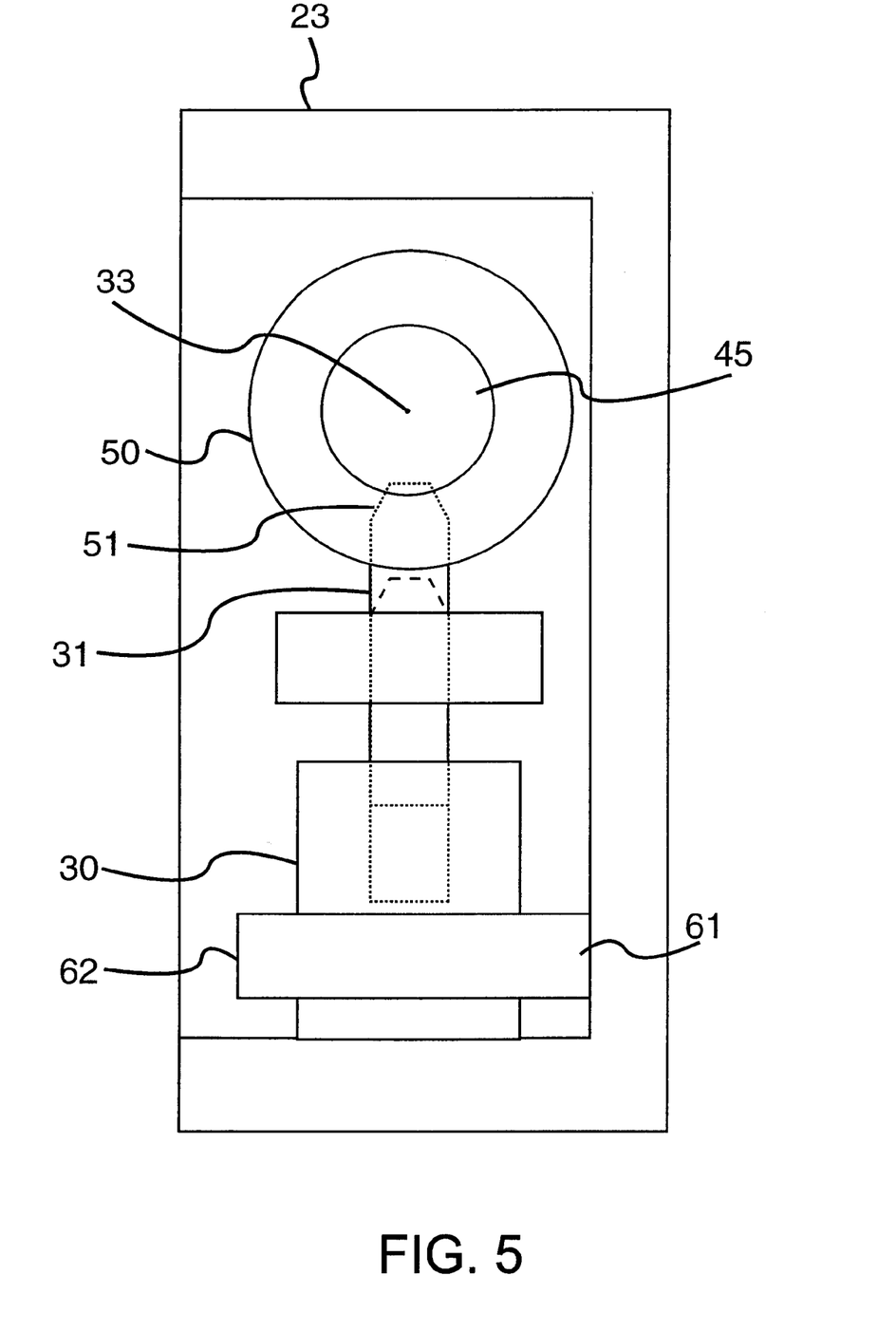
FIG. 5 is a cut-away side view illustrating a preferred embodiment of the present invention in the locked position.

FIG. 5 is a cut-away side view illustrating a preferred embodiment of the present invention in the locked position. FIG. 5 illustrates solenoid pin 31 inserted into hole 51 in locking disk 50, preventing locking disk 50 and main shaft 45 from rotating about pivot point 33 which is the central axis of main shaft 45. FIG. 5 also illustrates push-pull solenoid hold down clamp 61 held in place by screws 62.

In an alternate preferred embodiment, solenoid can be any other type of well-known electromechanical actuators such as servos or motors to receive a signal from the switch and in response to the signal from the switch to insert or remove the locking shaft from the aperture opening. The locking mechanism, in an alternate preferred embodiment, can be a hook dropped into a recess in or on main shaft 45, or can be any form of mechanical interruption in the rotation of main shaft 45.

Remote control device (not shown) is well-known technology and can include remote control keyless entry auto lock devices, pagers, DTMF signals or hidden switches on or near the dashboard of the automobile. Remote control keyless entry auto lock devices are commonly sold with automobiles. These devices have buttons for "lock," "unlock," and may have a security button which may cause a security alarm to sound. The "lock" button on these remote control devices may be programmed to lock the automobile anti-theft device as well as door locks. The remote control device may send a well-known radio or microwave frequency signal to a well-known electro-mechanical coupling device in push-pull solenoid 30 which energizes the locking or unlocking coil. Or, an additional button may be added to the remote control device to engage or disengage a preferred embodiment of the present invention.

In an alternate preferred embodiment, the remote control device might employ well-known pager technology to engage and disengage the automobile anti-theft device. In this alternate preferred embodiment, the automobile owner could subscribe to a pager service. If the owner determines that the automobile could be stolen, the owner could access this pager service, enter a specific security code, and request that a locking signal be sent to the automobile. Then, a signal could be sent to a preferred embodiment of the present invention. The signal could energize locking coil 69, cause pin 31 to extend into locking disk 50, and disengage the throttle from the accelerator pedal 21.

In a preferred embodiment of the present invention, this system could be used to disable the automobile even if the automobile is in motion. Pin 31 aligns with locking disk 50 when main shaft 45 is in the idle position. When the accelerator pedal is being pressed, and the engine is accelerating, main shaft is rotated so that the hole 51 in locking disk 50 is not aligned with pin 31. If a "lock" signal is sent to push-pull solenoid 30 when accelerator pedal 21 is being pressed, pin 31 will not successfully engage into hole 51 in locking disk 50. However, as soon as the unauthorized driver removes pressure from accelerator pedal 21 (to press on the brakes, for example) pin 31 could move slidingly into hole 51 in locking disk 50 to prevent the automobile from successfully accelerating again.

In a preferred embodiment of the present invention, combined with this remote control device, or in addition to it, a panic button could be installed on or around the dashboard of the automobile. Then, if the driver of the automobile is forced to relinquish control of the automobile by an unauthorized driver (i.e. if the driver is carjacked), the owner could discretely press the panic button to engage the locking disk, and disengage the throttle from the accelerator.

While the invention has been particularly shown and described with reference to preferred embodiments thereof, it will be understood by those skilled in the art that various changes in form and details may be made therein without departing from the spirit and scope of the invention.

What is claimed is:

1. An automobile anti-theft system affixed to the interior surface of a fire wall of an automobile and comprising:
    a locking mechanism contained inside a tamper-resistant box which couples the accelerator to the throttle, wherein said tamper-resistant box is affixed to the interior surface of the fire wall by fasteners inserted from an engine side of the fire wall, whereby a person disassembling the system by removing the fasteners must have access to the engine side of the fire wall, the locking mechanism having an aperture opening; and
    a locking shaft, the locking shaft selectively extendable into the aperture opening, such that when the locking shaft is not extended into the aperture opening the accelerator can operate the throttle and when the locking shaft is extended into the aperture opening the accelerator is prevented from operating the throttle.

2. The automobile anti-theft system of claim 1 further comprising a switch to selectively extend and retract said locking shaft into said aperture opening.

3. The automobile anti-theft system of claim 2 wherein said switch comprises a remote-control switch.

4. The automobile anti-theft system of claim 2 wherein said switch comprises an integrated paging system whereby said switch to be remotely actuated by the paging system.

5. The automobile anti-theft system of claim 2 wherein said switch comprises an under-the dash switch.

6. The automobile anti-theft system of claim 2 further comprising an electro-mechanical actuator to receive a signal from the switch and in response to the signal from the switch to insert or remove the locking shaft from the aperture opening.

7. The automobile anti-theft system of claim 6 wherein the electromechanical actuator is a solenoid.

8. The automobile anti-theft system of claim 6 wherein the electro-mechanical actuator is a servo.

9. The automobile anti-theft system of claim 6 wherein the electro-mechanical actuator is a motor.

10. The automobile anti-theft system of claim 1 further comprising a flexor to allow the accelerator to retain the ability to move even when the locking shaft is extended into the aperture opening and the accelerator is prevented from operating the throttle.

11. The automobile anti-theft system of claim 10 wherein said flexor is spring-steel whereby said accelerator shaft having two ends is comprised of spring-steel which allows said accelerator shaft to flex in response to pressure on one end of said accelerator shaft even when the other end of said accelerator shaft is fixed.

12. The automobile anti-theft system of claim 1 further comprising a loader whereby said locking mechanism can be engaged when an automobile is moving.

13. The automobile anti-theft system of claim 12 wherein said loader comprises a spring-loaded solenoid structured and arranged to actuate the locking mechanism by extending the locking shaft into a loaded position such that when the aperture rotates into alignment with the locking shaft, the locking shaft can spring into the aperture to prevent the accelerator from operating the throttle.

14. The automobile anti-theft system of claim 12, wherein said loader comprises a gravity-loaded solenoid structured and arranged to actuate the locking mechanism by extending the locking shaft into a loaded position such that when the aperture rotates into alignment with the locking shaft, the locking shaft can drop into the aperture to prevent the accelerator from operating the throttle.

15. An automobile anti-theft system comprising:
    a locking mechanism which couples the accelerator to the throttle, the locking mechanism comprising a main shaft;
    said main shaft comprising:
        an aperture opening; and
        two ends;
    wherein said main shaft comprises a central pivot axis about which said main shaft rotates;
    wherein said main shaft is coupled at one end to an accelerator shaft and at the other end to a throttle shaft; and
    a locking shaft, the locking shaft selectively extendable into the aperture opening;
    wherein when the locking shaft is not extended in to the aperture opening the accelerator shaft is coupled to the main shaft which is coupled to the throttle shaft such that rotational energy from the accelerator shaft causes the main shaft to rotate around the central pivot axis which transfers rotational energy to the throttle shaft and revs the engine; and,
    wherein when the locking shaft is extended into the aperture opening the main shaft is prevented from rotating about the central pivot axis such that rotational energy from the accelerator shaft does not cause the main shaft to rotate around the central pivot axis and does not transfer rotational energy to the throttle shaft and does not rev the engine; and
    a switch to selectively extend and retract said locking shaft into said aperture opening.

16. The automobile anti-theft system of claim 15 wherein said switch comprises a remote-control switch.

17. The automobile anti-theft system of claim 15 wherein said switch comprises an integrated paging system whereby said switch to be remotely actuated by said paging system.

18. The automobile anti-theft system of claim 15 wherein said switch comprises an under-the dash switch.

19. The automobile anti-theft system of claim 15 further comprising an electro-mechanical actuator to receive a signal from the switch and in response to the signal from the switch to insert or remove the locking shaft from the aperture opening.

20. The automobile anti-theft system of claim 19 wherein the electro-mechanical actuator is a solenoid.

21. The automobile anti-theft system of claim 19 wherein the electro-mechanical actuator is a servo.

22. The automobile anti-theft system of claim 19 wherein the electro-mechanical actuator is a motor.

23. The automobile anti-theft system of claim 15 wherein said system is affixed to the interior surface of a fire wall of an automobile.

24. The automobile anti-theft system of claim wherein said locking mechanism is contained inside a tamper-resistant box.

25. The automobile anti-theft system of claim 24 wherein said tamper-resistant box is affixed to the interior surface of a fire wall of an automobile by fasteners inserted from the engine side of the fire wall so that a person disassembling the system by removing the fasteners must have access to the engine side of the fire wall.

26. The automobile anti-theft system of claim 15 further comprising a flexor to allow the accelerator to retain the ability to move even when the locking shaft is extended into the aperture opening and the accelerator is prevented from operating the throttle.

27. The automobile anti-theft system of claim 26 wherein said flexor is spring-steel which allows said accelerator shaft to flex in response to pressure on one end of said accelerator shaft even when an other end of said accelerator shaft is fixed.

28. The automobile anti-theft system of claim 15 further comprising a loader to allow said locking mechanism to be actuated when an automobile is moving.

29. The automobile anti-theft system of claim 28 wherein said loader comprises a spring-loaded solenoid structured and arranged to actuate the locking mechanism by extending the locking shaft into a loaded position such that when the aperture rotates into alignment with the locking shaft, the locking shaft can spring into the aperture to prevent the accelerator from operating the throttle.

30. The automobile anti-theft system of claim 28 wherein said loader comprises a gravity-loaded solenoid structured and arranged to actuate the locking mechanism by extending the locking shaft into a loaded position such that when the aperture rotates into alignment with the locking shaft, the locking shaft can drop into the aperture to prevent the accelerator from operating the throttle.

31. An automobile anti-theft system comprising: a locking mechanism which couples the accelerator to the throttle, the locking mechanism comprising a main shaft said main shaft comprising:

an aperture opening; and two ends;

wherein said main shaft further comprises a central pivot axis about which said main shaft rotates;

wherein said main shaft is coupled at one end to an accelerator shaft and at the other end to a throttle shaft; and a locking shaft, the locking shaft selectively extendable into the aperture opening;

wherein when the locking shaft is not extended in to the aperture opening the accelerator shaft is coupled to the main shaft which is coupled to the throttle shaft such that rotational energy from the accelerator shaft causes the main shaft to rotate around the central pivot axis which transfers rotational energy to the throttle shaft and revs the engine; and wherein when the locking shaft is extended into the aperture opening the main shaft is prevented from rotating about the central pivot axis such that rotational energy from the accelerator shaft does not cause the main shaft to rotate around the central pivot axis and does not transfer rotational energy to the throttle shaft and does not rev the engine;

a remote control switch to selectively extend and retract said locking shaft into said aperture opening; and, a spring-loaded solenoid structured and arranged to actuate the locking mechanism by extending the locking shaft into a loaded position such that when the aperture rotates into alignment with the locking shaft, the locking shaft can spring into the aperture to prevent the accelerator from operating the throttle.

* * * * *